United States Patent
Dudar

(10) Patent No.: US 11,105,284 B1
(45) Date of Patent: Aug. 31, 2021

(54) METHOD AND SYSTEM FOR A VEHICLE EVAPORATIVE EMISSIONS CONTROL SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/063,479

(22) Filed: Oct. 5, 2020

(51) Int. Cl.
| | |
|---|---|
| *F02M 35/10* | (2006.01) |
| *F02M 25/08* | (2006.01) |
| *F02D 41/00* | (2006.01) |
| *G01S 19/42* | (2010.01) |
| *G07C 5/08* | (2006.01) |

(52) U.S. Cl.
CPC ..... *F02D 41/0077* (2013.01); *F02D 41/0032* (2013.01); *F02M 25/0809* (2013.01); *F02M 25/0836* (2013.01); *F02M 35/10222* (2013.01); *G01S 19/42* (2013.01); *G07C 5/0808* (2013.01)

(58) Field of Classification Search
CPC .. F02D 41/0077; F02D 41/0032; G01S 19/42; G07C 5/0808; F02M 25/0836; F02M 25/0809; F02M 35/10222
See application file for complete search history.

(56) References Cited

U.S. PATENT DOCUMENTS

| | | | | |
|---|---|---|---|---|
| 5,601,065 | A | * | 2/1997 | Tamura ............... F02D 41/0032 123/198 D |
| 7,448,367 | B1 | * | 11/2008 | Reddy .............. B60K 15/03519 123/519 |
| 2016/0215713 | A1 | * | 7/2016 | Dudar ................ F02M 25/0809 |
| 2017/0030302 | A1 | * | 2/2017 | Takezawa ........ B60K 15/03519 |
| 2017/0114744 | A1 | | 4/2017 | Martin et al. |
| 2020/0003164 | A1 | * | 1/2020 | Choi .................... G07C 5/0808 |
| 2020/0386193 | A1 | * | 12/2020 | Dudar ................ F02D 13/0203 |

* cited by examiner

Primary Examiner — George C Jin
(74) Attorney, Agent, or Firm — Geoffrey Brumbaugh McCoy Russell LLP

(57) ABSTRACT

Methods and systems are provided herein for a diagnostic routine of an internal vapor recovery line of an evaporative emissions control system of a vehicle. In one example, a method for an engine of a vehicle includes, during a refueling event, in response to a fuel tank pressure increasing upon fuel level reaching a threshold level lower than a target filling limit of a fuel tank, indicating a degradation of an internal vapor recovery line. In this way, engine shutoffs as a result of liquid fuel entering the evaporative emissions control system may be averted.

20 Claims, 7 Drawing Sheets

METHOD AND SYSTEM FOR A VEHICLE EVAPORATIVE EMISSIONS CONTROL SYSTEM

FIELD

The present description relates generally to methods and systems for detecting degradation in a fuel system of a vehicle, and more specifically, to detecting an internal line degradation within a fuel tank.

BACKGROUND/SUMMARY

Vehicles may be fitted with evaporative emission control (EVAP) systems such as onboard fuel vapor recovery systems. Such systems capture and reduce release of vaporized hydrocarbons to the atmosphere, for example, fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. A fuel tank may include one or more passive valves which may be linked internally within the fuel tank via one or more quick connectors. The valves may be opened and closed to vent pressurized air in the fuel tank to the canister via a vapor recovery line.

Various approaches have been developed for detecting undesired evaporative emissions and/or degraded components in such fuel vapor recovery systems. However, the inventors herein have recognized several potential issues with such methods. In particular, the inventors have recognized that it may be difficult to diagnose degradation in connections in the EVAP system that are internal to the fuel tank. As an example, a degradation of an internal vapor recovery line where emissions are not leaked to atmosphere may not be detected during EVAP diagnostics, such as by monitoring pressure in the EVAP system, the pressure generated by using engine vacuum, an active vacuum pump, natural vacuum techniques, etc. As a result, liquid fuel may enter into and block the vapor load line, causing an undesired increase in pressure of the fuel tank. The increase in pressure of the fuel tank may cause shutoffs of a refueling system during refueling, which may lengthen a duration of refueling and/or prevent refueling to a desired level of fuel. Further, liquid fuel richer than desired fuel mix may be sent to the engine, causing the engine to stall after a refuel event.

In one example, the issues described above may be addressed by a diagnostic method for an engine of a vehicle, comprising, during a refueling event, in response to a fuel tank pressure increasing upon fuel level reaching a threshold level lower than a target filling limit of a fuel tank, indicating a degradation of an internal vapor recovery line. In this way, engine shutoffs due to an increased richness of the air/fuel mix may be averted.

As an example, in order to diagnose an internal vapor recovery line within a fuel tank, during a refueling event, a change in the fuel tank pressure corresponding to an increase in fuel level in the tank may be monitored. When the fuel level reaches a level of an internal vapor recovery line, a degradation in the internal vapor recovery line (for example, a loose quick connect) may result in liquid fuel entering the internal vapor recovery line, which may block one or more vent valves, thereby causing pressure to build up in the tank. If a pressure buildup within the fuel tank is detected corresponding to the fuel level reaching the level of the vapor recovery line, a degradation may be detected in the internal vapor recovery line. In response to the indication of a degradation in the internal vapor recovery line such as due to disconnection of a quick connect, a vapor blocking valve may be closed to block liquid fuel from entering the canister and/or a mix of fuel that is too rich being sent to the engine. Additionally, after refueling, the engine may be operated unfueled in order to flush liquid fuel in EVAP lines to avert subsequent engine performance issues.

In this way, a degradation in the internal vapor recovery line may be effectively detected during a refueling event. Subsequently liquid fuel may be blocked from entering the vapor canister, thereby reducing the possibility of engine stalls. A technical advantage of purging the fuel vapor system of liquid fuel is that further tank venting may be resumed, whereby refueling may be carried out without refueling system shutoffs. An additional advantage of the diagnostic routine disclosed herein is that no additional hardware is used, thereby reducing a cost of the fuel system. Overall, by opportunistically monitoring the health of a vapor recovery line positioned within a fuel tank, engine stalls may be reduced and emissions compliance may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
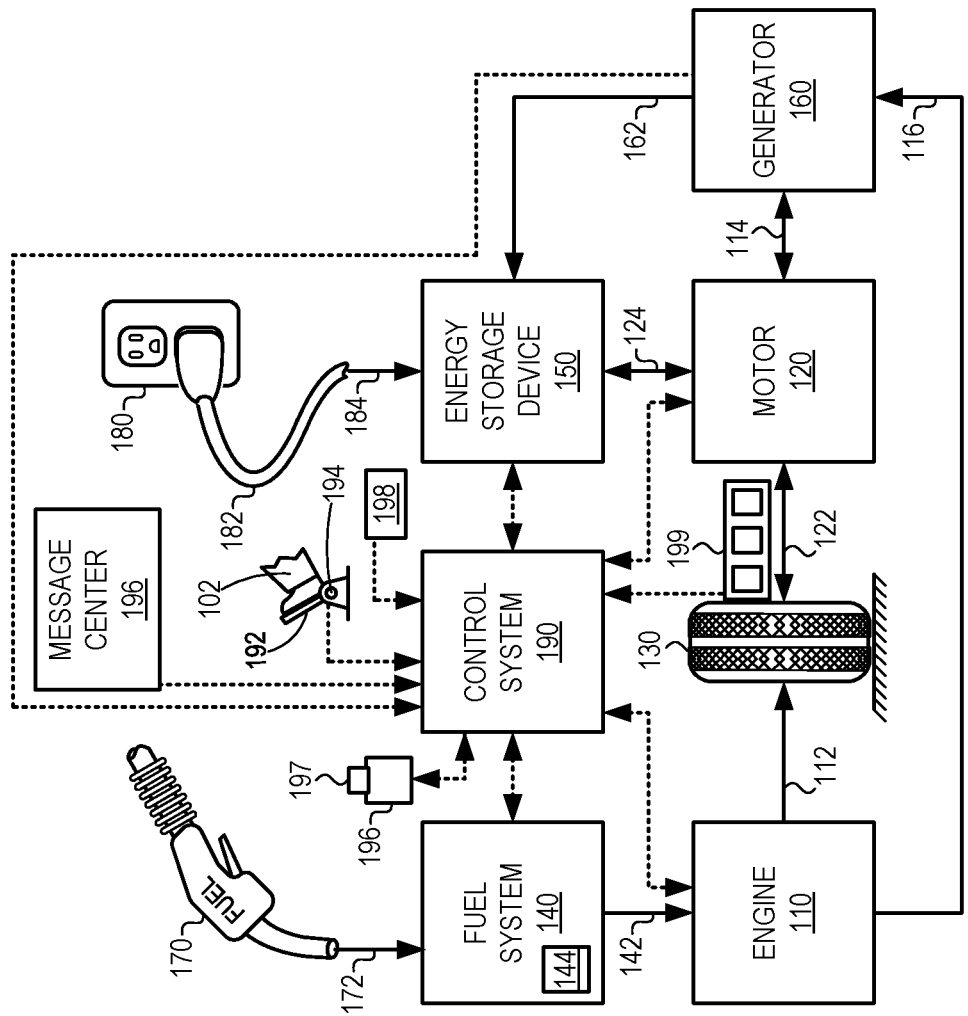
FIG. 1 shows an example vehicle propulsion system.
Figure 2:
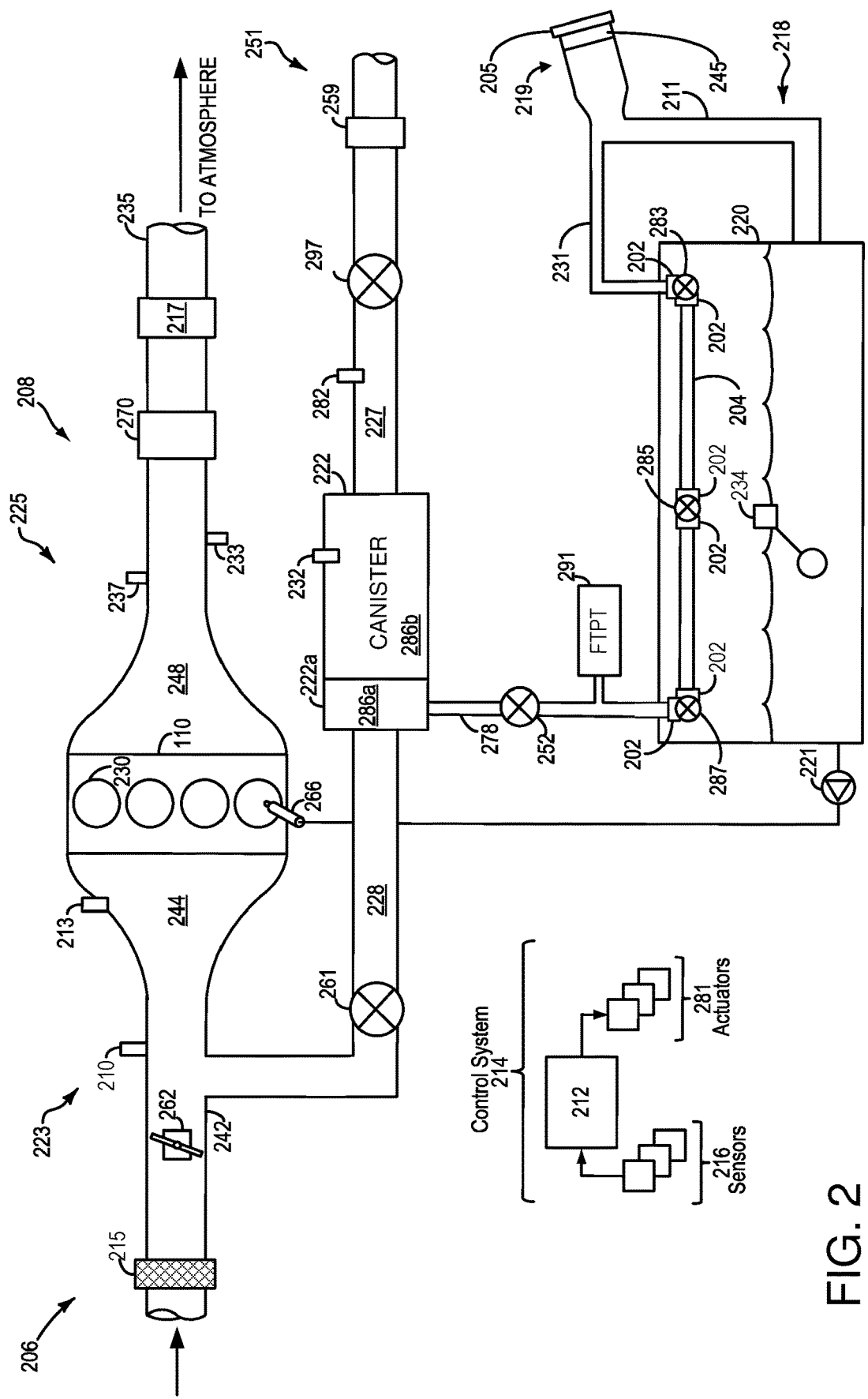
FIG. 2 shows an example vehicle system with a fuel system and an EVAP system.
Figure 3A:
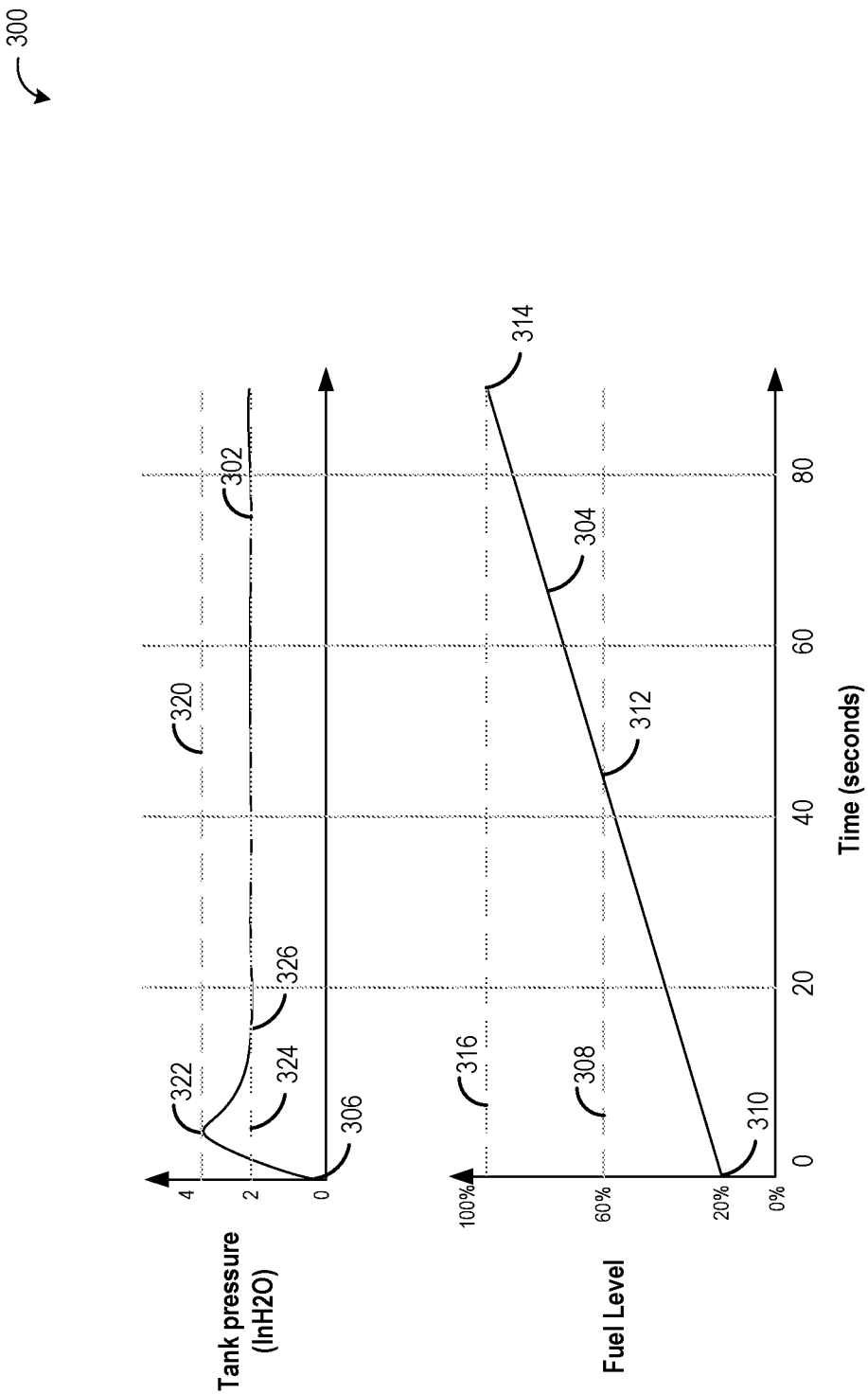
FIG. 3A shows a first example plot of change in fuel tank pressure during a refueling event.
Figure 3B:
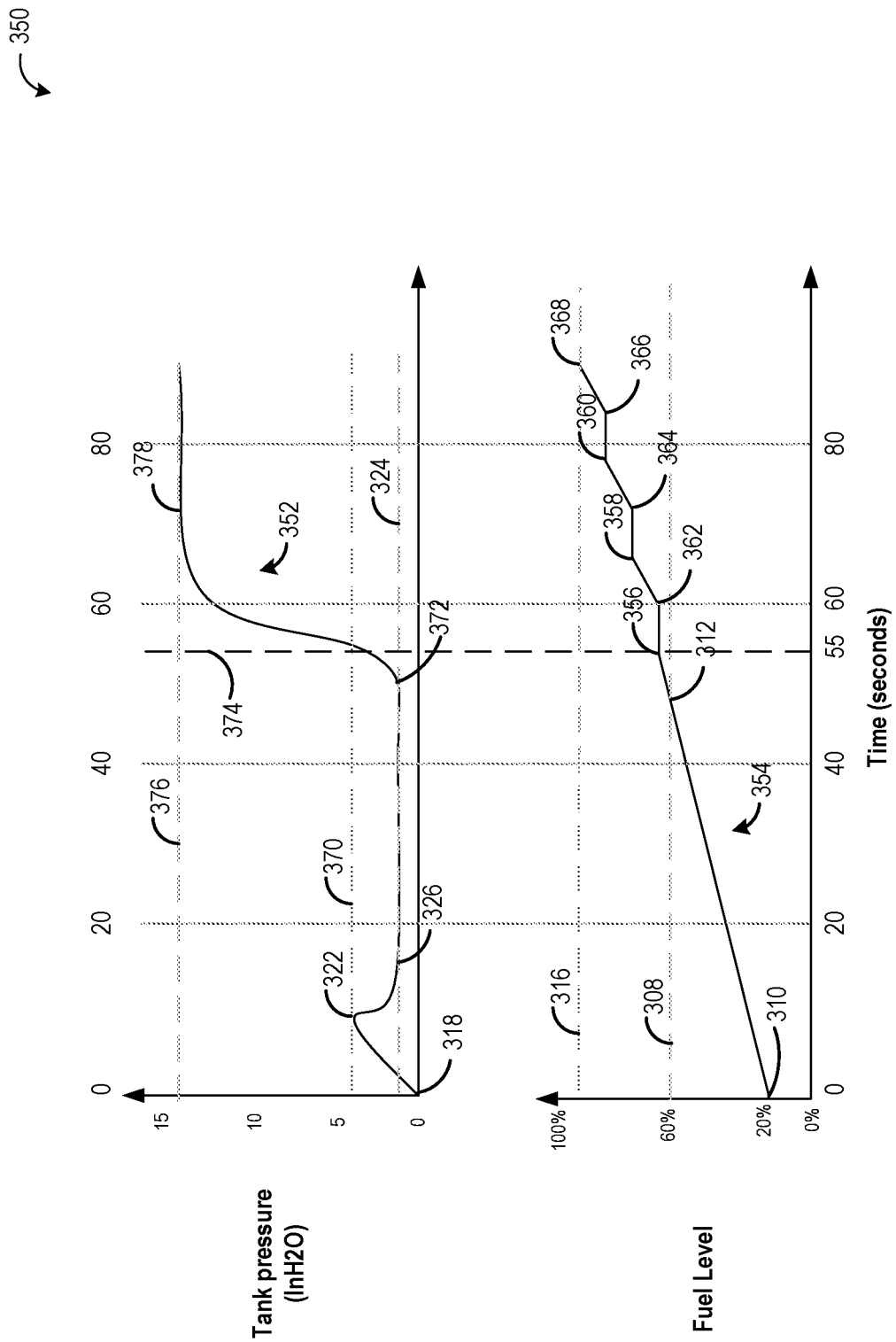
FIG. 3B shows a second example plot of change in fuel tank pressure during a refueling event.

An example hybrid vehicle propulsion system is depicted in FIG. 1. The vehicle propulsion system may include an engine system, an evaporative emission control (EVAP) system, and a fuel system with an internal vapor recovery line in a fuel tank, as shown in FIG. 2. A tank pressure may remain constant during refueling, as shown in FIG. 3A, indicating an internal vapor recovery line with no degradations, or a tank pressure may increase with fuel level over a threshold fuel level, as shown in FIG. 3B, indicating a degradation in couplings in the internal vapor recovery line. A controller may be configured to carry out a diagnostic routine for the internal vapor recovery line, as exemplified by the method of FIG. 4. In the event of detection of a degradation in the internal vapor recovery line, the internal vapor recovery line may be purged, once the fuel level falls below the vapor recovery line, according to a method described in FIG. 5.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

The fuel system 140 may include a vapor recovery line, which may be used to allow fuel vapors in the fuel tank 144 to vent to a vapor canister via one or more passive vent valves (e.g., grade vent valves, fuel limit valves, fuel intake valves, etc.). In some examples, the vapor recovery line may be an external vapor line arranged outside the fuel tank, and the one or more passive vent valves may be arranged on conduits that couple the vapor line to the fuel tank 144. In other examples, the vapor recovery line may be an internal vapor recovery line arranged inside the fuel tank 144, where the passive vent valves are coupled to the internal vapor recovery line.

Quick connectors (also called quick connects or snap fit connectors) may be used to couple various fluid-carrying conduits and components of the EVAP system, such as the passive vent valves coupled to the internal vapor recovery line. The connectors may be shaped and structured to be closed in a single uniaxial movement which facilitates automated assembly as well as part servicing. In addition, the simple design of the connector makes it inexpensive to manufacture. Quick connectors may comprise two or more components which may be latched and locked together by a twist-lock mechanism. Each component may have fitting ports for coupling with fuel system components. Over time, degradations may occur in the vapor recovery line. An example of a degradation of an internal vapor recovery line may be a disconnected quick connector, which can occur due to mis-assembly at a supplier, forgetting to push in a safety tab on a quick connector, or dislodging due to the vehicle being subjected to severe drive cycle or hauling conditions, etc.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to adjust a state of one or more of engine 110, motor 120, fuel system 140, energy storage device 150, and generator 160 responsive to this sensory feedback. For example, adjusting a state of the fuel system 140 may include adjusting an actuator of the fuel system (e.g., a fuel tank intake valve, canister vent valve, canister purge valve, etc.). Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. In some examples, a global positioning system (GPS) device may be coupled to the control system 190. A location of the vehicle may be determined via the GPS system. In one example, a diagnostic routine of the fuel system may use the GPS device to determine a proximity of the vehicle to a refueling station.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and filter 215 positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Alternatively, MAP may be inferred from alternate engine operating conditions, such as mass air flow (MAF), as measured by MAF sensor 210 coupled to the intake manifold.

Engine exhaust system 225 may further include a particulate filter (PF) 217. PF 217 may comprise a particulate filter, hydrocarbon trap, a catalyzed wash coat, or combination thereof. In some examples, during operation of engine 110, PF 217 may be periodically regenerated by operating at least one cylinder of the engine within a particular air-fuel ratio to increase a temperature of PF 217, such that retained hydrocarbons and soot particles may be oxidized.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 including a fuel vapor canister 222 via vapor recovery line 231, internal vapor recovery line 204, and load line 278, before being purged to the engine air intake 223. The vapor recovery line 204 may include one or more valves for isolating the fuel tank during certain conditions. For example, one or more fuel tank vent valves may be positioned on internal vapor recovery line 204. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, internal vapor recovery line 204 may include a first grade vent valve (GVV) 287, a fill limit venting valve (FLVV) 285, and a second grade vent valve (GVV) 283. One or both of the first GVV 287 and the second GVV 283 ensure that the fuel tank 220 is vented regardless of any incline. For example, if the vehicle is on an incline and the first GVV 287 is positioned at a lower end of the fuel tank 220, under the level of the fuel, the first GVV 287 may not vent air to the internal vapor recovery line 204, while the second GVV 283 positioned at a higher end of the fuel tank 220 above the level of fuel may vent air to the internal vapor recovery line 204. In contrast, the FLVV is a mechanical float valve that closes when the fuel reaches a threshold fuel level of the fuel tank 220. For example, if the fuel level is below the threshold fuel level, the FLVV 285 is in an open position, where fuel vapors from the fuel tank 220 are vented to the canister 222. When the fuel level reaches the threshold fuel level (e.g., 60% tank capacity), the FLVV 285 closes, where fuel vapors from the fuel tank 220 are not vented to the canister 222. Thus, when the fuel level is at the threshold fuel level, air from the fuel tank 220 may be vented to the canister 222 via the second GVV 283 and/or the first GVV 287, but not via the FLVV 285.

The first GVV 287, the FLVV 285, and the second GVV 283 may be coupled to the internal vapor recovery line 204 within the fuel tank 220 via a plurality of quick connectors 202. In this example, two quick connectors 202 are shown to couple each valve of the GVV 287, FLVV 285, and GVV 283.

In some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that vapor blocking valve 252 (VBV) may control venting of fuel tank 220 with the atmosphere. VBV 252 may be positioned between the fuel tank and the fuel vapor canister 222 within conduit 278. VBV 252 may be a normally closed valve, that when opened, allows for the venting of fuel vapors from the internal vapor recovery line 204 of the fuel tank 220 through the conduit 278 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open VBV 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open VBV 252 (when included), while maintaining canister purge valve 261 closed, to depressurize the fuel tank before allowing enabling fuel to be added therein. As such, VBV 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing VBV 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Over time due to usage, one or more quick connectors 202 may get disconnected, causing liquid fuel to enter the vapor recovery line 204 when a level of the fuel reaches the level of the vapor recovery line 204. Liquid fuel in the vapor recovery line 204 may block the passive vent valves of the vapor recovery line (e.g., GVV 287, FLVV 285, and GVV 283), thereby allowing pressure to build up in the tank during refueling, which may cause shutoffs of the refueling system during refueling. Further, liquid fuel may be drawn into the EVAP system during a purge routine, causing engine shutoffs during idling. Integrity of the internal fuel vapor recovery line 204, including the quick connectors 202, may be opportunistically confirmed by carrying out a diagnostic routine during a refueling event. In one example, the diagnostic routine includes monitoring a pressure of the fuel tank after the fuel reaches the level of the internal vapor recovery line 204 to determine if a pressure increase is being caused by one or more blocked vent valves. If an increase in the pressure of the fuel tank is detected, the VBV valve 252 may be closed, thereby blocking the liquid fuel from being drawn into the EVAP system. After refueling, once the level of the fuel falls below the internal vapor recovery line, the VBV valve 252 may be opened, and the internal vapor recovery line 204 may be purged by spinning the engine unfueled to generate an engine vacuum, whereby the liquid fuel is expelled through the engine.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, VBV 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines.

Figure 4:
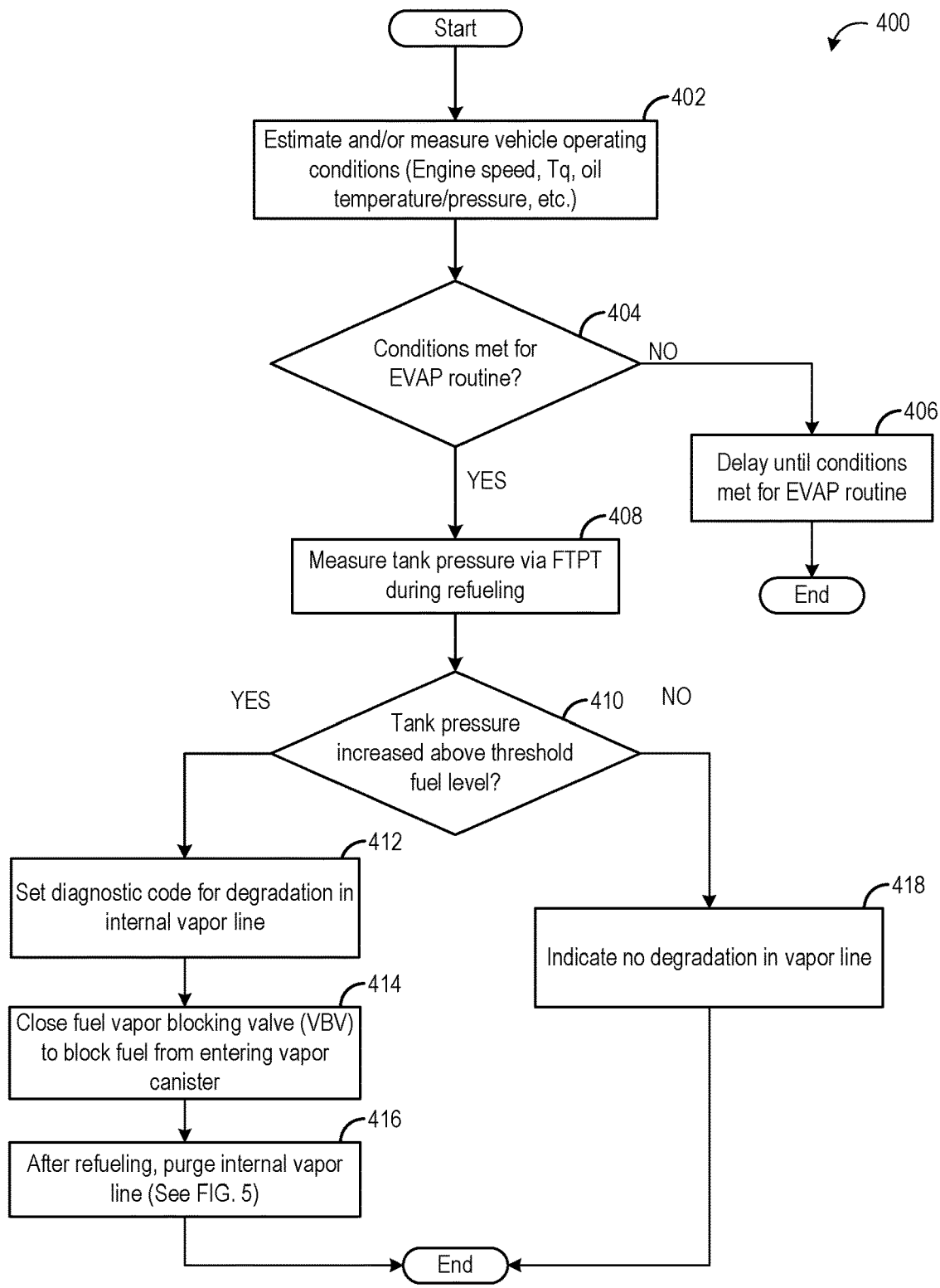
FIG. 4 is a flowchart illustrating an example method for determining a degradation in an internal vapor recovery line of a fuel tank.

Referring now to FIG. 4, an exemplary method 400 is shown for carrying out diagnostics of an internal vapor recovery line (such as the vapor recovery line 204 of fuel system 218 of FIG. 2) inside a fuel tank (such as fuel tank 220 of FIG. 2) of a vehicle. Instructions for carrying out method 400 and all other methods included herein may be executed by a controller (e.g., the controller 212 of control system 214 of FIG. 2) based on instructions stored on a memory of the controller and in conjunction with signals received from sensors of the vehicle propulsion system, such as the sensors of the vehicle system, such as the sensors described above with reference to FIGS. 1-2. The controller may employ actuators of the vehicle propulsion system in accordance with the methods described below.

At 402, method 400 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, etc., as described above in reference to vehicle propulsion system 100 of FIG. 1). Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. Estimating and/or measuring vehicle operating conditions may include determining whether the HEV vehicle is being powered by an engine or an electric motor (e.g., the engine 110 or the electric motor 120 of vehicle propulsion system 100 of FIG. 1). Estimating and/or measuring vehicle operating conditions may further include determining a state of a fuel system of the vehicle, such as a level of fuel in the fuel tank, determining a state of one or more valves of the fuel system (e.g., a vent valve, refueling valve, vapor blocking valve, etc.).

At 404, method 400 includes determining whether one or more conditions have been met to carry out diagnostics of the internal vapor recovery line arranged inside the fuel tank. The conditions for initiation of the diagnostic routine may include determining whether the vehicle is in a state of operation. For example, the diagnostic routine may be performed when the engine is off (e.g., during refueling), whereby the controller may determine via an engine sensor whether the engine is off or on prior to initiating the diagnostic routine.

The conditions may also include initiation of a refueling event, for example, if a sensor of the fuel filler system (e.g., the fuel filler system 219 of fuel system 218 of FIG. 2) indicates that a fuel door or fuel lock is open.

In one example, the controller of the vehicle may estimate a location of the vehicle via a global positioning system (GPS) or via wireless communication with a remote server. The controller may use the estimated location of the vehicle to estimate a location of the closest refueling station, for example, by consulting a lookup table, online database, etc. The controller may measure a distance between the location of the vehicle and a location of the closest refueling station. If the distance between the location of the vehicle and a location of the closest refueling station is below a threshold distance (e.g., 10 meters), and the engine is switched OFF, and the fuel level is below a threshold value (e.g., below 50% capacity), the controller may determine that a refueling event is about to occur, and as a result, may initiate the diagnostic routine as refueling is initiated.

The conditions to run the EVAP routine may further include a fuel level being below a threshold fuel level. For example, the controller may determine via a fuel level sensor (e.g., the fuel level sensor 234 of fuel system 218 of FIG. 2) that the fuel is below a level of the internal vapor recovery line, whereby the fuel in the fuel tank is not in contact with the vapor recovery line, vent valves, and quick connectors, and vapors of the fuel tank may enter the internal vapor recovery line via the passive vent valves. Meeting the conditions to run the EVAP routine may also include a vapor blocking valve (e.g., the VBV 252 of fuel system 218 of FIG. 2) being open, whereby vapors of the fuel tank may vent to a canister of the fuel system, and/or whether a pressure of the fuel tank is within a desired pressure range. For example, initiation of the EVAP routine may depend on the pressure of the fuel tank being at or close to a desired pressure (e.g., atmosphere), whereby the controller may determine whether the pressure of the fuel tank is above a first threshold pressure and/or below a second threshold pressure (e.g., for atmospheric pressure, within a range of +/−1.5 InH2O).

The conditions to initiate the diagnostic routine may also include determining whether one or more other diagnostic and/or EVAP routines are being executed, and further determining whether a result of the one or more diagnostic and/or EVAP routines detects a degradation in a different part of the fuel system, evaporative emissions system, and/or engine system. If a degradation or issue is detected in a different part of the fuel system, the EVAP routine may not be performed. Alternatively, if no other degradations or issues are detected in the fuel system, the EVAP routine may be performed.

For example, the controller may receive pressure data from a fuel tank pressure transducer (FTPT) (e.g., the FTPT 291 of fuel system 218 of FIG. 2) indicating that the pressure of the full tank is high due to diurnal temperature cycles and a closed vapor blocking valve (e.g., when a HEV vehicle is operating with an electric motor). The controller may attempt to adjust the vapor blocking valve to an open position to release pressurized fuel vapors from the fuel tank into a vapor canister, thereby reducing the pressure of the fuel tank. However, the controller may determine that the vapor blocking valve does not fully open. As a result, a diagnostic code for a faulty vapor blocking valve may be set, and the diagnostics routine may not be performed.

It should be appreciated that the example conditions disclosed herein are for illustrative purposes, and more, less, or different conditions may be used to determine whether to run the diagnostic routine without departing from the scope of this disclosure. In one example, the diagnostic routine is performed if the controller determines that the engine is off, a refueling event is about to occur, the level of fuel is below a threshold level representing 60% capacity corresponding to the level of the internal vapor recovery line, no other diagnostic routines have detected degradations or issues in the fuel and/or EVAP system, and the pressure of the fuel tank is at atmosphere.

If conditions are not met for running the diagnostic routine at 404, at 406, method 400 includes initiation of the internal vapor recovery line routine may be delayed until conditions have been met, and method 400 ends. If conditions are met for running the internal vapor recovery line routine, method 400 proceeds to 408. At 408, method 400 includes monitoring a tank pressure via the FTPT pressure sensor during the refueling event. Monitoring the pressure includes initiating measurement of the fuel tank pressure upon initiation of the fueling event such as confirmed by opening of the refueling door, and continuing the pressure measurement until the refueling event is complete such as confirmed by closing of the refueling door.

At 410, method 400 includes determining whether, after reaching a threshold fuel level, pressure of the fuel tank increases abruptly. For example, the controller may monitor a fuel level of the fuel tank via a fuel level sensor (e.g., the fuel level sensor 234 of the fuel system 218 of FIG. 2). In one example, the threshold fuel level is at least 60% of the fuel tank capacity. Once the threshold fuel level has been achieved, the controller may monitor the pressure of the fuel tank to determine whether an increase in the pressure of the fuel tank exceeds a threshold pressure increase (e.g., if the pressure of the fuel tank increases by 10%). In an example, the controller does not monitor the pressure until the threshold fuel level has been reached (e.g., the diagnostic routine does not consider pressure changes prior to reaching the threshold fuel level.

As described above in relation to FIGS. 3A and 3B, if no degradation exists in the internal vapor recovery line or the vent valves, or the quick connectors inside the fuel tank, pressure in the fuel tank generated by a decrease in vapor space as the fuel level rises is released into the internal vapor recovery line for subsequent purging, whereby the pressure of the fuel tank does not change. Alternatively, if a degradation exists in the internal vapor recovery line or the vent valves or the quick connectors inside the fuel tank, pressure generated by the decrease in vapor space as the fuel level rises may not be released into the internal vapor recovery line for subsequent purging, and the pressure of the fuel tank may increase. Therefore, an increase in the pressure of the fuel tank during refueling, after the level of the fuel reaches the level of the internal vapor recovery line, may indicate a blockage in the internal vapor recovery line, whereby pressurized vapors in the fuel tank are not released into the internal vapor recovery line and the vapor canister. For example, liquid fuel may have leaked into the internal vapor recovery line via a leak in the internal vapor recovery line or a loose quick connect coupling, thereby blocking one or more vent valves coupled to the internal vapor recovery line (e.g., GVV 287, FLVV 285, and GVV 283 of the fuel system 218 of FIG. 2).

If it is determined that the pressure inside the fuel tank has increased at 410, it may be inferred that liquid fuel has entered the internal vapor recovery line due to a degradation in the line and the method 400 proceeds to 412. At 412, a diagnostic code (flag) may be set indicating degradation in the internal vapor recovery line. In one example, the degradation in the in the internal vapor recovery line may be caused by one or more quick connectors of the internal vapor recovery line becoming loose causing connections in the vapor recovery line to break. In another example, the degradation in the internal vapor recovery line may be caused due to an opening (such as a leak) in a valve coupled to the internal vapor recovery line or in the vapor line.

At 414, a fuel vapor blocking valve (e.g., the VBV valve 252 of EVAP system 251 of FIG. 2) may be closed to block liquid fuel from entering the vapor canister. If a fuel intake valve or vapor blocking valve is open when liquid fuel enters the internal vapor recovery line, the liquid fuel may be drawn into the vapor canister by a negative pressure (e.g., a vacuum) created in the engine intake as a result of a spinning of the engine. If liquid fuel from the fuel tank enters the vapor canister, a mix of air and fuel sent to the engine may be adjusted, whereby the mix of air and fuel may be richer than desired. As a result, the engine may stall during idle when purge control turns on.

Figure 5:
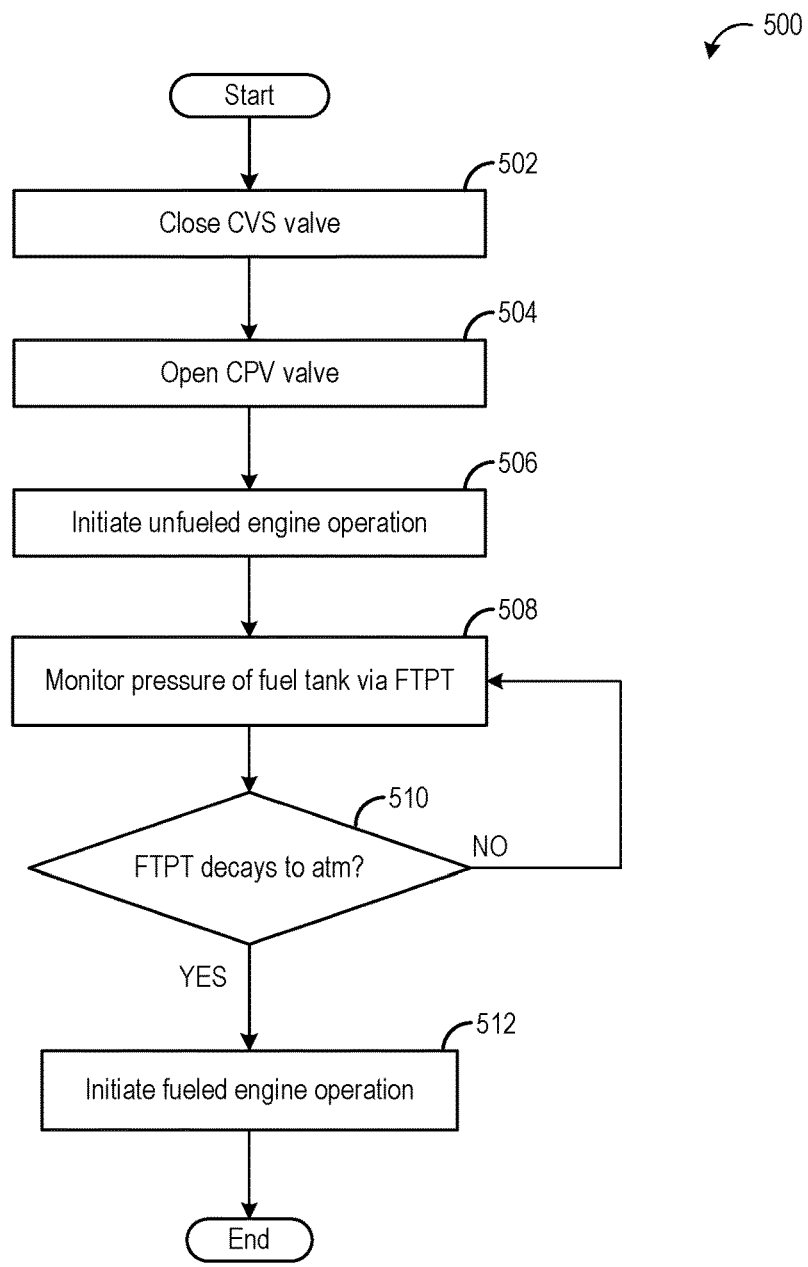
FIG. 5 is a flowchart illustrating an example method for purging the internal vapor recovery line of a fuel tank.

For example, when the vehicle is being propelled by the engine, a purge valve (e.g., the purge valve 261 of EVAP system 251 of FIG. 2) may be closed, whereby no vapors from the vapor canister enter an intake of the engine (e.g., the engine intake 223 of engine system 208 of FIG. 5). When the engine is operating and the vehicle is not being propelled by the engine (e.g., idling), a purge control routine may be carried out whereby vapors from the vapor line are drawn into and captured by the vapor canister to be released into the engine intake as part of an evaporative emissions control routine. However, if liquid fuel enters the internal vapor recovery line and is drawn into the vapor canister (e.g., by engine vacuum), during the purge control routine, the mix of air and fuel released into the engine intake may be richer than desired. As a result of a richer air/fuel mix, the engine may stall and/or an efficiency of the engine may be decreased. Thus, engine stalls occurring after a refuel event may be averted by closing the vapor blocking valve when a degradation is detected in the internal vapor recovery line.

At 416, method 400 includes purging the internal vapor recovery line, whereby the internal vapor recovery line is purged of fuel that has entered the internal vapor recovery line due to the degradation. Purging the internal vapor recovery line is described in greater detail below in relation to FIG. 5.

If at 410 it is determined that the pressure of the fuel tank has not increased after the level of the fuel reaches the level of the internal vapor recovery line and the pressure remains substantially constant through the end of refueling, method 400 proceeds to 418. At 418, as the pressure of the fuel tank has not increased, it may be inferred that no degradation exists in the internal vapor recovery line, and each of the internal vapor recovery line, the vent valves, and the quick connectors remain robust inside the fuel tank. Therefore, at 418, method 400 includes indicating that no degradations are present in the vapor line, and method 400 ends.

Referring now to FIGS. 3A and 3B, plots of pressure changes in a fuel tank (such as fuel tank 220 of fuel system 218 of FIG. 2) of a vehicle with an increase in fuel level in the fuel tank during refueling is shown. The pressure in the fuel tank may be estimated via a fuel tank pressure sensor (such as FTPT 291 of fuel system 218 of FIG. 2) coupled to the fuel tank.

FIG. 3A shows a first example plot 300, which includes a tank pressure plot 302 and a fuel level plot 304. The tank pressure plot 302 illustrates a change of pressure of a fuel tank over time, where a tank pressure is indicated on a vertical, y axis. The fuel level plot 304 illustrates a change in a fuel level, where the fuel level is indicated on a vertical, y axis as a percentage of the fuel tank capacity. In both the tank pressure plot 302 and the fuel level plot 304, time is indicated on a horizontal, x axis as measured in seconds. In this way, for a time t on the horizontal axis, a point on the tank pressure plot 302 indicates a tank pressure for a corresponding fuel level indicated by a point on the fuel level plot 304. For example, at time t=0, a pressure at point 306 (e.g., 0.5 InH2O) of the tank pressure plot 302 corresponds to a fuel level indicated at point 310 of fuel level plot 304 (e.g., 20%). It should be appreciated that the time and pressure values indicated on the horizontal and vertical axes are for illustrative purposes, and other values may be included without departing from the scope of this disclosure.

As indicated by fuel level plot 304 (e.g., at point 306), upon initiating refueling, the level of fuel in the tank is at 20%, as indicated by point 310. As the vehicle is refueled, fuel level plot 304 shows a steadily increasing fuel level. At point 312, fuel level plot 304 crosses a fuel level threshold line 308. The fuel level threshold may correspond to a level of the internal vapor recovery line of the fuel tank, whereby as the fuel level indicated by fuel level plot 314 passes the fuel level threshold line, the internal vapor recovery line comes in contact with the liquid fuel. In one example, the fuel level threshold line 308 is at 60% of tank capacity. Thus, when the fuel level exceeds 60% capacity of the fuel tank, the internal vapor recovery line is covered by the liquid fuel. As refueling continues, at point 314 the fuel level plot 304 reaches a tank capacity line 316 (e.g., just below 100% on the vertical axis), at which point refueling stops and no further fuel enters the fuel tank.

As the fuel level increases as shown by fuel level plot 304, the tank pressure plot 302 shows a corresponding pressure of the fuel tank. Upon initiation of refueling, as fuel enters the tank, the tank pressure plot 302 indicates that the pressure of the tank increases until reaching a maximum pressure at point 322 and thereafter the pressure in the tank stabilizes. The pressure of the fuel tank gradually decreases below the maximum pressure and stabilize at almost a constant pressure line 324 at point 326. From point 326 until the tank has been completely filled (the tank pressure plot 302 indicates that the pressure remains substantially (such as within 5% variation) constant.

As fuel is pumped into the tank, the pressure of the tank may initially increase as a volume of vapor space decreases due to displacement by liquid fuel. When the tank pressure reaches a threshold pressure (e.g., 3.8InH2O, at the maximum pressure point 322), passive vent valves of the internal vapor recovery line (e.g, the vent valves GVV 287, FLVV 285, and GVV 283 of the fuel system 218 of FIG. 2) may open. When the vent valves open, pressurized air in the vapor space of the fuel tank may be released into the vapor canister, and the pressure of the fuel tank may begin to decrease. At point 326, the pressure may stop decreasing and remain constant until refueling has been completed. The pressure of the fuel tank may not decrease until after refueling as the vent valves may not release air in the fuel tank fast enough to completely offset the pressure increase in the fuel tank generated by the rising level of fuel.

FIG. 3B shows a shows a second plot 350 which includes a tank pressure plot 352 and a fuel level plot 354. The tank pressure plot 352 illustrates a change of pressure of a fuel tank over time, where a tank pressure is indicated on a vertical, y axis. The fuel level plot 354 illustrates a change in a fuel level, where the fuel level is indicated on a vertical axis, y as a percentage of the fuel tank capacity. In both the tank pressure plot 352 and the fuel level plot 354, time is indicated on a horizontal axis, x as measured in seconds. In this way, for a time t on the horizontal axis, a point on the tank pressure plot 352 at time t indicates a tank pressure for a corresponding fuel level indicated by a point on the fuel level plot 354 at time t. It should be appreciated that the time and pressure values indicated on the horizontal and vertical axes are for illustrative purposes, and other values may be included without departing from the scope of this disclosure.

As indicated by fuel level plot 354, upon initiating refueling, the level of fuel in the tank is at 20%, as indicated by point 310. As the vehicle is refueled, fuel level plot 354 shows a steadily increasing fuel level until point 312, where fuel level plot 354 crosses the fuel level threshold line 308, as in FIG. 3A. The fuel level threshold may correspond to a level of the internal vapor recovery line of the fuel tank, whereby as the fuel level indicated by fuel level plot 314 passes the fuel level threshold line, the internal vapor recovery line comes in contact with the liquid fuel. However, in contrast to the fuel level plot 304 of FIG. 3A, fuel level plot 354 of FIG. 3B shows that as refueling continues, refueling is halted at point 356, resumed at point 362, halted again at point 358, resumed at point 364, halted again at point 360, and resumed at point 366, until reaching the tank capacity line 316 (e.g., just below 100% on the vertical axis), at which point refueling stops and no further fuel enters the fuel tank.

As the fuel level increases as shown by fuel level plot 354, the tank pressure plot 352 shows a corresponding pressure of the fuel tank. When refueling is initiated, as fuel enters the tank, the tank pressure plot 352 indicates that the pressure of the tank increases rapidly until reaching a maximum pressure at point 322, where the tank pressure plot 302 intersects with an initial high pressure line 370 (e.g., at the maximum pressure line 320 of FIG. 3A). As the level of fuel continues to rise, the pressure of the fuel tank gradually decreases until stabilizing at a substantially constant pressure as shown by line 324 at point 326. From point 326 until point 372, the tank pressure plot 352 indicates that the pressure remains substantially constant.

However, at point 372 the tank pressure plot 352 indicates a rapid increase in pressure until intersecting with a maximum pressure line 376 at point 378. The maximum pressure line 376 may correspond to a measuring limit for the fuel tank pressure sensor. As indicated by first refueling system shutoff line 374, refueling is halted at point 356 of the fuel level plot 354 as a result of the increase in pressure of the fuel tank starting at point 272 of the tank pressure plot 352. Thus, as the pressure increases between point 272 and point 378, the refueling system is repeatedly shut off (e.g., at points 356, 358, and 360), only to be resumed again (e.g., at points 362, 364, and 366).

For example, as fuel is pumped into the tank, the pressure of the tank may initially increase as a volume of vapor space decreases due to displacement by liquid fuel. As the level of fuel passes the level of the internal vapor recovery line indicated by the fuel level threshold line 308, the internal vapor recovery line of the fuel tank may drop below the level of the liquid fuel in the fuel tank. If there is a degradation in the internal vapor recovery line, for example, a loose quick connect that couples the internal vapor recovery line to the passive vent valves (e.g, the vent valves GVV 287, FLVV 285, and GVV 283 of the fuel system 218 of FIG. 2), the liquid fuel may leak into the internal vapor recovery line, thereby blocking the vent valves. As the vent valves become blocked, air from the vapor space of the fuel tank may not be vented to the vapor canister, and pressure may build up in the fuel tank, as shown by the tank pressure plot 352. Thus, a rapid increase in pressure after the fuel level reaches the threshold fuel level as indicated by the tank pressure plot 352 may be used to detect a degradation in the internal vapor recovery line that may be allowing liquid fuel to enter the internal vapor recovery line.

Referring now to FIG. 5, an exemplary method 500 is shown for purging fuel from an internal vapor recovery line inside a fuel tank of a vehicle. Fuel may have entered the internal vapor recovery line via one or more of a loose quick connect that couples a vent valve to the vapor line, a degraded vent valve, and/or a degraded vapor line. As the fuel is consumed by an engine of the vehicle, a level of the fuel in the fuel tank may decrease. As the level of the fuel in the fuel tank decreases, the level of the fuel may fall below a level of the internal vapor recovery line, whereby the internal vapor recovery line is exposed to air in a vapor space of the fuel tank. When the internal vapor recovery line of the fuel tank is exposed to air and the fuel level is below the level of the vapor recovery line, the vapor recovery line may be purged of the fuel that has entered the vapor recovery line through a loose quick connector, degradation in the vapor recovery line, or degradation in a vent valve of the vapor recovery line by method 500. The fuel tank, internal vapor recovery line, quick connect, and vent valve of the vehicle may be the same as or similar to the fuel tank 220, the internal vapor recovery line 204, the quick connectors 202, and/or the vent valves GVV 287, FLVV 285, and GVV 283 of the fuel system 218 of FIG. 2.

At 502, method 500 includes closing a canister vent solenoid (CVS) valve (e.g., canister vent valve 297 of EVAP system 251 of FIG. 2). When the CVS valve is in an open state, air may flow from atmosphere through the canister to the engine intake (e.g., the engine air intake 223 of engine system 208 of FIG. 1) purging the canister. By closing the CVS valve, air from atmosphere is not permitted to enter the canister from atmosphere.

At 504, method 500 includes opening a canister purge valve (CPV) (e.g., purge valve 261 of EVAP system 251 of FIG. 2). When the CPV valve is opened, a fluidic communication is established between the canister and the engine intake. At 506, unfueled operation of the engine may be initiated. In one example, an electric motor (e.g., the motor 120 of vehicle propulsion system 100 of FIG. 1) may be used to spin the engine while fuel is not injected to the engine cylinders (combustion disabled). Spinning the engine generates an engine vacuum, thereby introducing a pressure difference between the fuel vapor recovery system and the negative pressure of the engine intake. As a result of the pressure difference, an air flow is initiated that draws liquid fuel from the vapor line (e.g., that has entered due to a loose quick connect) into the engine intake through the vapor canister, thereby purging the internal vapor recovery line of the liquid fuel.

At 508, method 500 includes monitoring the pressure of the fuel tank by measuring an output signal of the fuel tank pressure transducer (FTPT), and at 510, method 500 includes determining whether the output signal of the FTPT decays to atmosphere. A decreasing output signal of the FTPT may be an indication that the internal vapor recovery line has been cleared of liquid fuel. For example, liquid fuel in the internal vapor recovery line may block one or more vent valves of the internal vapor recovery line (e.g., GVV 287, FLVV 285, and GVV 283 of the fuel system 218 of FIG. 2), whereby a pressure increase of the fuel tank may not be mitigated by normal venting. As the liquid fuel is drawn from the internal vapor recovery line and purged via the engine intake, the vent valves of the internal vapor recovery line may become unblocked, thereby allowing normal venting, thus decreasing the pressure of the fuel tank.

If it is determined at 510 that the output signal of the FTPT does not decay to atmosphere, the routine may return to step 508 and monitoring of the fuel tank pressure may be continued. If at 510 it is determined that the FTPT decays to atmosphere, method 500 proceeds to 512. At 512, method 500 includes initiating fueled (e.g., normal) engine operation, and method 500 ends.

Figure 6:
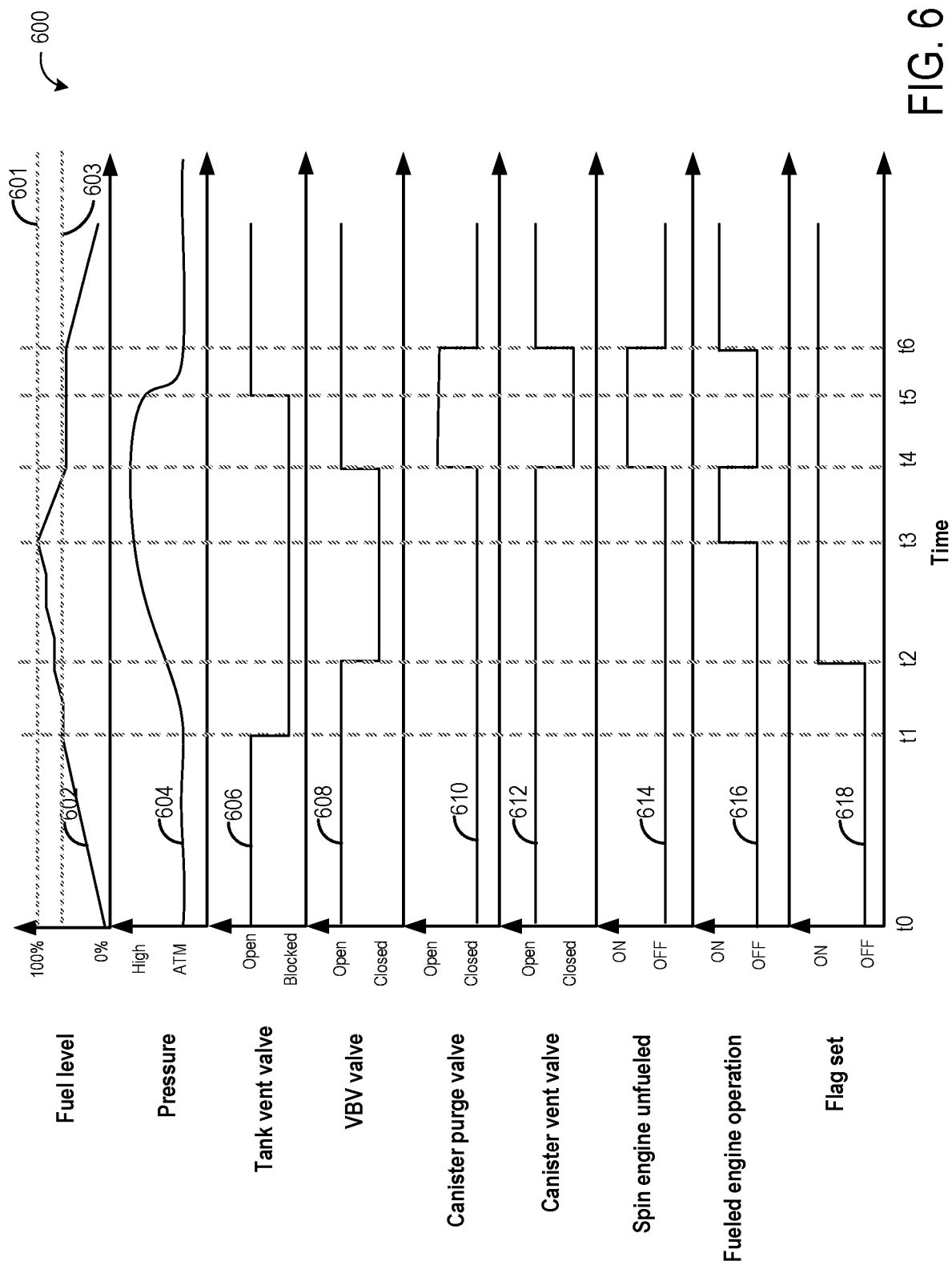
FIG. 6 is a timing diagram illustrating a timing of a diagnostic routine for an internal vapor recovery line of a fuel tank.

Referring now to FIG. 6, an operating sequence 600 is shown that illustrates an example of a diagnostic routine for an internal vapor recovery line of a fuel tank of a vehicle (e.g., the internal vapor recovery line 204 of fuel tank 220 of FIG. 2). The horizontal (x-axis) denotes time and the vertical lines t1-t4 identify significant times in the operation of the diagnostic routine.

The operating sequence 600 includes nine plots. The first plot, line 602, shows variation in fuel level over time, during a refueling event of the vehicle. The second plot, line 604, shows variation in a pressure of the fuel tank as measured via a fuel tank pressure transducer (e.g., the FTPT 291 of FIG. 2). The third plot, line 606, shows a position of a vent valve. For example, the vent valve may be open, whereby fuel vapors of the fuel tank are vented to the internal vapor recovery line, or the vent valve may be blocked, whereby fuel vapors of the fuel tank are not vented to the internal vapor recovery line. In one example, the vent valve may be a plurality of vent valves (e.g., the GVV 287, FLVV 285, and/or GVV 283 of fuel system 218 of FIG. 2) that operate together. For example, when one vent valve is open, the other vent valves of the plurality of vent valves may also be open, and when one vent valve is blocked, the other vent valves of the plurality of vent valves may also be blocked (e.g., due to the same cause). The fourth plot, line 608, shows a position of a vapor blocking valve (VBV) of the EVAP system (e.g., the VBV 252 of fuel system 218 of FIG. 2). For example, the VBV may be open, whereby fuel vapors of the fuel tank are vented to a vapor canister, or the VBV may be closed, whereby the fuel tank is sealed from the vapor canister and air and/or fuel are blocked from entering the vapor canister. The fifth plot, line 612, shows a position of a canister purge valve. For example, the canister purge valve may be open, whereby fuel vapors of the vapor canister are vented to one or more engine cylinders of an engine of the vehicle, or the canister purge valve may be closed, whereby fuel vapors of the vapor canister are not vented to the one or more engine cylinders of the vehicle. The sixth plot, line 614, shows a position of a canister vent valve. For example, the canister vent valve may be open, whereby air from the atmosphere may be drawn into the vapor canister for purging fuel vapors during a purge routine, or the canister vent valve may be closed, whereby air from the atmosphere is not drawn into the vapor canister for purging fuel vapors during a purge routine. The seventh plot, line 616, shows an operation of the engine of the vehicle in an unfueled state. For example, the engine may be spun during a deactivated state of the engine where combustion of fuel at the engine is discontinued. In one example, the engine is spun by an electric motor. As described in greater detail above in relation to method 500 of FIG. 5, spinning the engine in an unfueled state generates an engine vacuum, whereby liquid fuel and/or fuel vapors may be drawn into the engine for purging. The eighth plot, line 618, shows an operation of the engine of the vehicle in a fueled state, whereby fuel from the fuel tank is injected into the engine (e.g., for propelling the vehicle). The ninth plot, line 620, shows the setting of a diagnostic flag from an OFF position to an ON position when a degradation condition in the internal vapor recovery line is detected. For example, upon detection of a degradation (e.g., a loose quick connector) during the diagnostic routine, a diagnostic code may be set within a control system of the vehicle. As a result of the diagnostic code, the internal vapor recovery line may be checked the next time the vehicle is serviced, and/or an operator of the vehicle may be notified via an indication on a dashboard of the vehicle (e.g., a light, etc.) that the vehicle may need to be serviced.

At time t0, the engine is not operated to propel the vehicle and the engine is off, as shown by line 616 and line 618. The EVAP system of the vehicle is configured such that the vent valve is open, as shown by line 606, the VBV valve is open, as shown by line 608, the canister purge valve is closed, as shown by line 612, and the canister vent valve is open, as shown by line 614. In this valve configuration, fuel vapors from the fuel tank are vented to the vapor canister for subsequent purging, and therefore the pressure of the fuel tank is at atmosphere, as shown by line 604. At time t0, the fuel tank is empty, as shown by line 602, and a refueling event of the vehicle is initiated.

Between time t0 and t1, line 602 indicates that a fuel level of the vehicle increases as liquid fuel enters the fuel tank during refueling. As the fuel enters the fuel tank, line 604 indicates that the pressure of the fuel tank is maintained at atmosphere, as air displaced by the rising fuel level is vented to the vapor canister via the open VBV valve.

At time t1, the fuel level of the fuel tank reaches a threshold fuel level, indicated by dotted threshold fuel line 603. As described above in relation to FIGS. 3A and 3B, the threshold fuel level corresponds to a level of the internal vapor recovery line in the fuel tank, whereby when the fuel level reaches the threshold level, the internal vapor recovery line comes in contact with the liquid fuel. In one example, the threshold fuel level is set at 60% of a capacity of the fuel tank. When the fuel level reaches the threshold level at t1, the pressure of the fuel tank is monitored to detect a possible pressure increase between time t1 and t2. At time t1, as the fuel level passes the internal vapor recovery line, a degradation of the internal vapor recovery line allows liquid fuel to enter the internal vapor recovery line, blocking the vent valve, as shown by line 606. In one example, the degradation is a loose quick connector that couples the vent valve to the internal vapor recovery line.

Between time t1 and t3, refueling continues and the level of fuel continues to rise, as shown by line 602. However, as a result of the blocking of the internal vapor recovery line, venting of the fuel tank does not occur, and the pressure of the tank increases, as shown by line 604, as the fuel level reaches a target fill level (e.g., 100%) indicated by dotted target fill line 601. The increase in pressure causes shutoffs of the refueling system, where line 602 indicates that refueling is repeatedly halted and resumed. At time t2, in response to the increase in the pressure of the tank, it is inferred that a vent valve is blocked and consequently degradation of the vapor line is indicated. Upon detection of the degradation at time t2, the VBV valve is actuated to a closed position, as shown by line 608, whereby the liquid fuel in the internal vapor recovery line is blocked from being drawn into the vapor canister during a subsequent purge routine. Concurrently, a diagnostic flag of the control system is set to ON, indicating a degradation in the internal vapor recovery line, as shown by line 618.

At time t3, the fuel level reaches the target fuel level shown by dotted target fill line 601, and refueling stops. Fueled operation of the engine initiates, as shown by line 616, and between t3 and t4, the fuel level decreases as fuel is consumed by the engine, as shown by line 602.

At time t4, the fuel level decreases below the level of the internal vapor recovery line, shown by dotted line 603, whereby the internal vapor recovery line is exposed to the air and no longer in contact with the liquid fuel. When the internal vapor recovery line is exposed to the air and no longer in contact with the liquid fuel, the tank vent valve becomes unblocked, as shown by line 606. The VBV valve is opened, as shown by line 608, the canister purge valve is opened, as shown by line 610, and the canister vent valve is closed, as shown by line 612. Fueled operation of the engine is terminated, as shown by line 616, and as shown by line 614, the engine is started in an unfueled state where combustion of fuel at the engine does not occur, where the propelling of the vehicle and the spinning of the engine is powered by an electric motor of the vehicle.

Between t4 and t5, the engine is spun in an unfueled state, whereby an engine vacuum is generated without injecting fuel into one or more engine cylinders of the engine. As a result of the configuration of the VBV valve, canister purge valve, and canister vent valve, the engine vacuum draws the liquid fuel from the internal vapor recovery line through the VBV valve to the vapor canister and out to the engine for purging, as described above in relation to method 500 of FIG. 5.

At t5, the vent valve is unblocked as the liquid fuel is purged from the internal vapor recovery line, as shown by line 606, and the fuel tank begins to vent pressurized air to the internal vapor recovery line. As the fuel tank begins to vent, the pressure of the fuel tank decays to atmosphere, as shown by line 604.

At t6, as a result of the decrease in the pressure of the fuel tank, the diagnostic routine determines that internal vapor recovery line has been purged, and the canister purge valve is closed (as shown by line 610) and the canister vent valve is opened (as shown by line 612) to stop purging. Spinning of the engine in an unfueled state is stopped, as shown by line 614, the engine initiates fueled operation, as shown by line 616. As fueled operation resumes, the fuel level decreases as fuel is consumed by the engine, as indicated by line 602.

In this way, a degradation of the internal vapor recovery line (e.g., a loose quick connector) may be detected by monitoring the pressure of the fuel tank after a threshold fuel level is reached during refueling. If an increase in tank pressure is detected, it may be inferred that a vent valve of the internal vapor recovery line is blocked by liquid fuel, and one or more valves of an EVAP system may be adjusted to purge the internal vapor recovery line. Further, by closing a vapor blocking valve upon detection of a degradation, liquid fuel may be blocked from entering the vapor canister and causing engine stalls after refueling. The technical effect of purging the fuel vapor system of liquid fuel is that engine stalls after refueling may be averted and further tank venting may be resumed. An additional advantage of the diagnostic routine disclosed herein is that no additional hardware is used, thereby reducing a cost of the fuel system. Overall, by opportunistically monitoring the health of a vapor recovery line positioned within a fuel tank, engine stalls may be reduced and emissions compliance may be maintained.

In another representation, the vehicle is an HEV.

An example provides for a method for an engine of a vehicle, comprising, during a refueling event, in response to a fuel tank pressure increasing upon fuel level reaching a threshold level lower than a target filling limit of a fuel tank, indicating a degradation of an internal vapor recovery line. In a first example of the method, the internal vapor recovery line is within the fuel tank. In a second example of the method, which optionally includes the first example, the fuel tank pressure increasing includes the fuel tank pressure exceeding a threshold pressure increase. In a third example of the method, which optionally includes one or both of the first and second examples, the internal vapor recovery line includes one or more vent valves coupled to the internal vapor recovery line via one or more quick connectors, and wherein the indicated degradation indicates loose quick connector. In a fourth example of the method, which optionally includes one or more of each of the first through third examples, the one or more vent valves include at least one grade vent valve and a fill limit venting valve. In a fifth example of the method, which optionally includes one or more of each of the first through fourth examples, the threshold fuel level corresponds to a position of the internal vapor recovery line within the fuel tank. In a sixth example of the method, which optionally includes one or more of each of the first through fifth examples, the threshold fuel level is at least 60% of a capacity of the tank. In a seventh example of the method, which optionally includes one or more of each of the first through sixth examples, the method further comprises, in response to an indication of a degradation of the internal vapor recovery line, closing a vapor blocking valve coupled to the vapor recovery line to block liquid fuel from entering a fuel vapor canister of an evaporative emission control (EVAP) system of the vehicle. In an eighth example of the method, which optionally includes one or more of each of the first through seventh examples, the method further comprises, in response to an indication of a degradation of the internal vapor recovery line, after completing the refueling event, purging the internal vapor recovery line. In a ninth example of the method, which optionally includes one or more of each of the first through eighth examples, purging the internal vapor recovery line includes adjusting one or more valves of an EVAP system, and operating the engine unfueled to flush liquid fuel in lines of the EVAP system to one or more cylinders of the engine. In a tenth example of the method, which optionally includes one or more of each of the first through ninth examples, adjusting the one or more valves of the EVAP system includes adjusting a canister purge valve to an open position, adjusting a canister vent valve to a closed position, and adjusting a vapor blocking valve to an open position.

An example provides for a method for an engine of a vehicle, comprising, during a lower than threshold fuel level in a fuel tank, in response to a location of the vehicle being a refueling station, monitoring a change in a pressure in the fuel tank with a change in fuel level in the fuel tank during a refueling event; and in response to the pressure in the fuel tank increasing by more than a threshold pressure upon the fuel level in the fuel tank reaching a threshold fuel level, indicating a degradation of an internal vapor recovery line housing one or more vent valves. In a first example of the method, the location of the vehicle is determined to be a refueling station based on estimating a location of the vehicle via a GPS system; and in response to the estimated location, estimating a proximity of the vehicle to a refueling station on a map. In a second example of the method, which optionally includes the first example, the one or more vent valves include a first grade vent valve (GVV), a fill limit venting valve (FLVV), and a second grade vent valve (GVV).

An example provides for a system of a vehicle, comprising a controller, storing instructions in non-transitory memory that, when executed, cause the controller to: during refueling; estimate a change in a fuel level of a fuel tank of the vehicle via a fuel level sensor; monitor a pressure in the fuel tank via a pressure sensor coupled to a fuel line; and in response to the pressure in the fuel tank increasing upon the fuel level of the fuel tank reaching a level of an internal vapor recovery line positioned within the fuel tank, indicate a degradation in the internal vapor recovery line. In a first example of the method, determining whether the pressure of the fuel tank is increasing includes determining whether a pressure increase exceeds a threshold pressure increase. In a second example of the method, which optionally includes the first example, the instructions further comprise closing a vapor blocking valve of the internal vapor recovery line to block liquid fuel from entering an EVAP system of the vehicle in response to an indication of a degradation of the internal vapor recovery line. In a third example of the method, which optionally includes each of the first and second examples, the instructions further comprise setting a diagnostic code in a control system of the vehicle in response to an indication of a degradation of the internal vapor recovery line. In a fourth example of the method, which optionally includes each of the first through third examples, the instructions further comprise, after refueling, purging the internal vapor recovery line in response to an indication of a degradation of the internal vapor recovery line. In a fifth example of the method, which optionally includes each of the first through fourth examples the instructions for purging the internal vapor recovery line include spinning an engine of the vehicle in an unfueled state to generate an engine vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
   during a refueling event, in response to a fuel tank pressure increasing upon fuel level reaching a threshold level lower than a target filling limit of a fuel tank;
   indicating a degradation of an internal vapor recovery line.

2. The method of claim 1, wherein the internal vapor recovery line is within the fuel tank.

3. The method of claim 1, wherein the fuel tank pressure increasing includes the fuel tank pressure exceeding a threshold pressure increase.

4. The method of claim 1, wherein the internal vapor recovery line includes one or more vent valves coupled to the internal vapor recovery line via one or more quick connectors, and wherein the indicated degradation indicates loose quick connector.

5. The method of claim 4, wherein the one or more vent valves include at least one grade vent valve and a fill limit venting valve.

6. The method of claim 1, wherein the threshold fuel level corresponds to a position of the internal vapor recovery line within the fuel tank.

7. The method of claim 1, wherein the threshold fuel level is at least 60% of a capacity of the tank.

8. The method of claim 1, further comprising, in response to an indication of a degradation of the internal vapor recovery line, closing a vapor blocking valve coupled to the vapor recovery line to block liquid fuel from entering a fuel vapor canister of an evaporative emission control (EVAP) system of the vehicle.

9. The method of claim 1, further comprising, in response to the indication of the degradation of the internal vapor recovery line, after completing the refueling event, purging the internal vapor recovery line.

10. The method of claim 9, wherein purging the internal vapor recovery line includes adjusting one or more valves of an EVAP system, and operating the engine unfueled to flush liquid fuel in lines of the EVAP system to one or more cylinders of the engine.

11. The method of claim 10, wherein the adjusting the one or more valves of the EVAP system include adjusting a canister purge valve to an open position, adjusting a canister vent valve to a closed position, and adjusting a vapor blocking valve to an open position.

12. A method for an engine of a vehicle, comprising:
during a lower than threshold fuel level in a fuel tank,
in response to a location of the vehicle being a refueling station,
monitoring a change in a pressure in the fuel tank with a change in fuel level in the fuel tank during a refueling event; and
in response to the pressure in the fuel tank increasing by more than a threshold pressure upon the fuel level in the fuel tank reaching a threshold fuel level, indicating a degradation of an internal vapor recovery line housing one or more vent valves.

13. The method of claim 12, wherein the location of the vehicle is determined to be a refueling station based on estimating a location of the vehicle via a GPS system; and in response to the estimated location, estimating a proximity of the vehicle to a refueling station on a map.

14. The method of claim 12, wherein the one or more vent valves include a first grade vent valve (GVV), a fill limit venting valve (FLVV), and a second grade vent valve (GVV).

15. A system for an engine in a vehicle, comprising:
a controller, storing instructions in non-transitory memory that, when executed, cause the controller to:
during refueling,
estimate a change in a fuel level of a fuel tank of the vehicle via a fuel level sensor;
monitor a pressure in the fuel tank via a pressure sensor coupled to a fuel line;
in response to the pressure in the fuel tank increasing upon the fuel level of the fuel tank reaching a level of an internal vapor recovery line positioned within the fuel tank, indicate a degradation in the internal vapor recovery line.

16. The system of claim 15, wherein the increase in pressure in the fuel tank includes the increase in pressure in the fuel tank exceeding a threshold pressure increase.

17. The system of claim 15, wherein the instructions further comprise closing a vapor blocking valve of the internal vapor recovery line to block liquid fuel from entering an EVAP system of the vehicle in response to the indication of the degradation of the internal vapor recovery line.

18. The system of claim 15, wherein the instructions further comprise setting a diagnostic code in a control system of the vehicle in response to the indication of the degradation of the internal vapor recovery line.

19. The system of claim 15, wherein the instructions further comprise, after refueling, purging the internal vapor recovery line in response to the indication of the degradation of the internal vapor recovery line.

20. The system of claim 19, wherein the purging the internal vapor recovery line includes spinning the engine of the vehicle in an unfueled state to generate an engine vacuum and flush liquid fuel from the EVAP system to one or more cylinders of the engine.

* * * * *